United States Patent
Cole et al.

(10) Patent No.: US 9,228,903 B2
(45) Date of Patent: Jan. 5, 2016

(54) INFRARED IMAGER

(75) Inventors: Barrett E. Cole, Morristown, NJ (US); Robert Higashi, Morristown, NJ (US); Yue Liu, Morristown, NJ (US); Teresa M. Marta, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 796 days.

(21) Appl. No.: 13/548,779

(22) Filed: Jul. 13, 2012

(65) Prior Publication Data

US 2014/0312230 A1   Oct. 23, 2014

Related U.S. Application Data

(60) Provisional application No. 61/535,137, filed on Sep. 15, 2011, provisional application No. 61/535,123, filed on Sep. 15, 2011.

(51) Int. Cl.
| | |
|---|---|
| *G01J 5/20* | (2006.01) |
| *G01J 5/08* | (2006.01) |
| *H04N 5/33* | (2006.01) |
| *G01J 5/06* | (2006.01) |
| *G01J 5/00* | (2006.01) |

(52) U.S. Cl.
CPC .............. *G01J 5/0803* (2013.01); *G01J 5/061* (2013.01); *G01J 5/08* (2013.01); *G01J 5/0896* (2013.01); *G01J 5/20* (2013.01); *H04N 5/33* (2013.01); *G01J 2005/0077* (2013.01); *G01J 2005/063* (2013.01)

(58) Field of Classification Search
CPC ............ G01J 5/08; G01J 5/0803; H04N 5/37; H01N 5/33
USPC ....................................................... 250/338.4
See application file for complete search history.

(56) References Cited

U.S. PATENT DOCUMENTS

| | | | |
|---|---|---|---|
| 4,545,641 A * | 10/1985 | Sobey, Jr. ........................ | 359/288 |
| 5,900,799 A * | 5/1999 | Morris ............................ | 338/18 |
| 6,670,599 B2 | 12/2003 | Wagner et al. | |
| 6,879,014 B2 | 4/2005 | Wagner et al. | |
| 6,985,281 B2 | 1/2006 | Wagner et al. | |
| 7,002,697 B2 | 2/2006 | Domash et al. | |
| 7,049,004 B2 | 5/2006 | Domash et al. | |
| 7,304,799 B2 | 12/2007 | Ma et al. | |
| 7,402,803 B1 * | 7/2008 | Wagner et al. ............. | 250/338.3 |
| 7,491,060 B1 | 2/2009 | Ma | |
| 7,522,328 B2 | 4/2009 | Wagner et al. | |
| 7,697,192 B2 | 4/2010 | Wagner et al. | |
| 7,829,854 B2 | 11/2010 | Wagner et al. | |
| 2007/0023661 A1* | 2/2007 | Wagner et al. ............. | 250/338.1 |
| 2008/0158635 A1* | 7/2008 | Hagood et al. ............... | 359/230 |
| 2014/0312230 A1* | 10/2014 | Cole et al. ................. | 250/338.4 |

OTHER PUBLICATIONS

"The New Light in Spectroscopy". REDSHIFT. OpTIC Optical Thermal Imaging Cameras. Date accessed: Apr. 7, 2014 from http://reshiftsystems.com/site/TechnologyProducts/Products/tabid/73/Defaulth.aspx.

* cited by examiner

*Primary Examiner* — Constantine Hannaher
*Assistant Examiner* — Meenakshi Sahu
(74) *Attorney, Agent, or Firm* — Brooks, Cameron & Huebsch, PLLC

(57) ABSTRACT

Devices, methods, and systems relating to infrared imager devices, methods for providing infrared imagers, methods of operating infrared imagers, and infrared imager systems are disclosed. An infrared imager system includes a number of lenses, a beam splitter, an imager array, and a thermo-optical array, wherein the beam splitter directs light to the imaging array and to the thermo-optical array.

20 Claims, 6 Drawing Sheets

INFRARED IMAGER

STATEMENT OF GOVERNMENT RIGHTS

The subject matter of this disclosure was made with government support under the Government Program Department of Interior/DARPA under Contract No.: D11PC20020. Accordingly, the U.S. Government has certain rights to subject matter disclosed herein.

TECHNICAL FIELD

The present disclosure relates to infrared imager devices, methods for providing infrared imagers, methods of operating infrared imagers, and infrared imager systems.

BACKGROUND

Un-cooled bolometer camera designs are very sophisticated, achieving high performance but at a high cost. Much of the cost of the camera is related to the cost of the array, the readout electronics, the addressing carbon metal oxide semiconductor (CMOS) in the array, the display electronics, and various other electronics systems. These features are all included to achieve high performance image, but at a high cost.

In such devices, infrared light from a target is imaged onto an array containing many pixels. This light, when illuminating a typical bolometer pixel, creates a change in the resistance of a "temperature sensing film" which is fabricated from a vanadium oxide ($VO_x$) material.

Such a bolometer readout is achieved by forming these pixels on top of CMOS electronics which provide the row and column multiplexed addressing of a bias current which interrogates each pixel for a resistance change produced by the temperature increase caused by absorbed long wavelength infrared (LWIR) target radiation. The readout is achieved via CMOS-bolometer integration. These devices may also have limited responsivity, may have issues with noise, and utilize electrical contact to the $VO_x$ material, which may inhibit thermal isolation, in some implementations.

DETAILED DESCRIPTION

Infrared imager devices, methods for providing infrared imagers, methods of operating infrared imagers, and infrared imager systems are described herein. One or more device embodiments include a number of lenses, a beam splitter, an imaging array, and a thermo-optical array.

Figure 1:
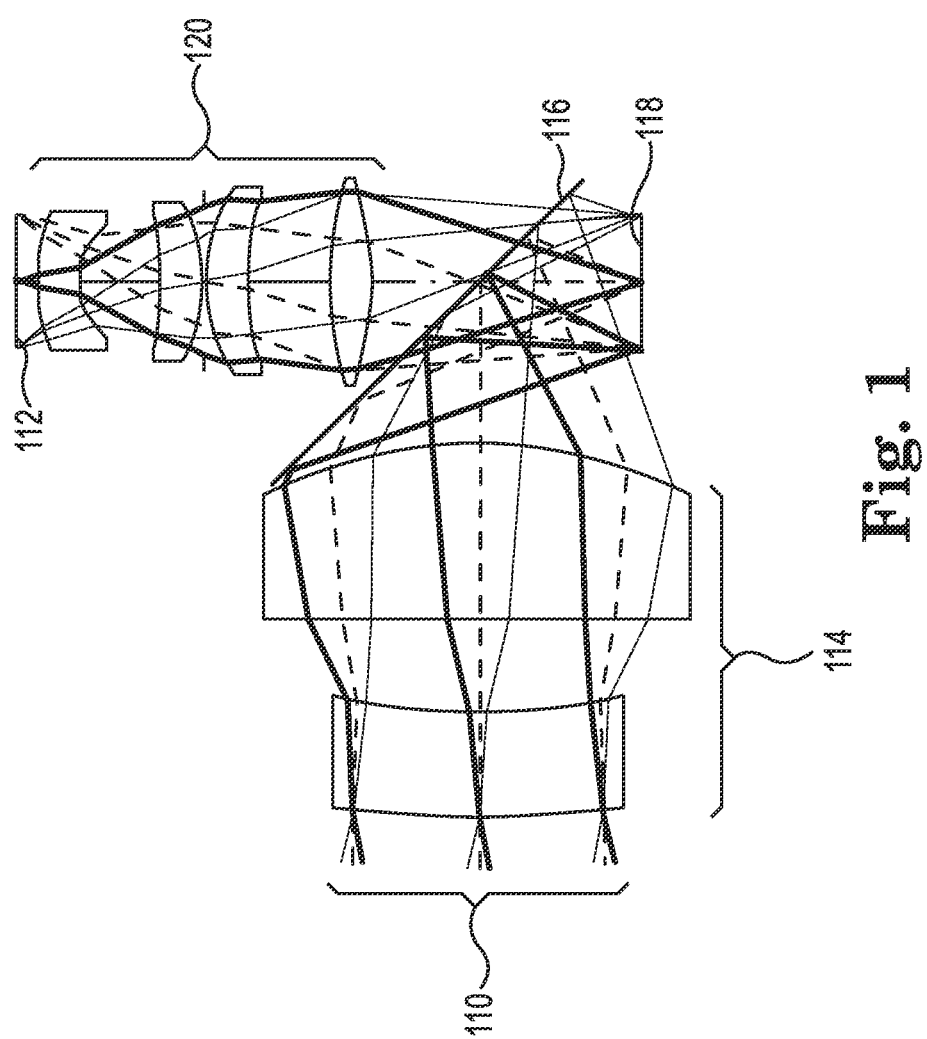
FIG. 1 illustrates a general system for use in accordance with one or more embodiments of the present disclosure.

In various embodiments, the device can also include a backlight source. In some embodiments, the device can also include one or more lenses, for example, positioned between the backlight and the thermo-optical array, between the source of the light and the thermo-optical array, and/or between the backlight and the imaging array. In such embodiments, a beam splitter or filter may be provided between any of these elements, as is shown in FIG. 1.

In various embodiments, a thermo-optical array is utilized that has a thermo-optical effect which causes transitions from transparent to opaque with respect to light in response to temperature changes. By focusing infrared (IR) light, such as LWIR on the thermo-optical array, the transitions may be representative of an image of the object generating the IR light.

In some embodiments, the thermo-optical array may be directly viewed by a user where transitions are in a visible light range without the need for much of the expensive features of prior IR cameras. In various embodiments, the transitions may be wavelengths that are not directly visible, but may be detected by a sensor such as a CMOS charge coupled device (CCD) image array and can, for example, be converted to a signal which can be used to drive a user viewable display.

In various embodiments, IR light strikes an array of pixels that have an absorbing film silicon nitride ($Si_3N_4$) and a $VO_2$-based thermo-optical array. The absorbing film is a thermo-optical responsive film, such that its transmissivity to selected ranges of light changes responsive to IR radiation. Crystalline $VO_2$ can, for example, undergo a semiconductor metal transition at 67° C. that transforms the material from transparent to reflective and/or opaque, in some implementations.

By adding other metals to $VO_2$, the transition temperature may be lowered, for example, to 20° C., thereby lowering the temperature of the reflective-transparent transition. The slope of a transition curve may also be modified to provide visual changes in the thermo-optical array representative of a wider or narrower range of temperatures.

IR light striking the array that is in this transition region, will heat up pixels individually depending on the intensity of light coming from the viewed target. The absorbed heat from the IR light causes the reflectance and transmission of each pixel to change in a desired wavelength range of light in response to the level of IR power received.

This change can be viewed directly by a user or via an image sensor (e.g., imaging array), and may be enhanced by using a backlight system. Such a backlight can be utilized to transmit light in the desired wavelength range. The array in some embodiments may be totally passive and/or in some embodiments, the display may be powered and other components of the assembly may be passive.

FIG. 1 illustrates a general system for use in accordance with one or more embodiments of the present disclosure. In the embodiment illustrated in FIG. 1, infrared light 110 is received via imaging optics (e.g., a lens) and is provided to a thermal detector array 112.

The thermal detector array 112 is an array of pixels having an absorbing film and thermo-optical array that transitions from transparent to opaque with respect to light in response to temperature changes. In some embodiments, the thermo-optical array does not transition between totally transparent or opaque to a desired wavelength range of light, such as visible light, but rather varies in the amount of light transmitted through it.

In embodiments utilizing one or more lenses prior to the light contacting the array, by focusing infrared light, such as LWIR via the lens on the array, the transitions may be representative of images generating the infrared light. Any suitable type of optics can be utilized in various embodiments. Chalcogenide optics can provide good LWIR optical transmission and can be molded to achieve this performance and lower cost than standard Ge optics, in some implementations.

The thermo-optical array may be directly viewed by a user in the case of changes in the visible light range. In some embodiments, a display can be provided to enhance the images on the array. The display may include a sensor to sense light within the visible range and/or within another range of light not visible to user, such as light having wavelengths around 1.1 μm to 1.5 μm, or other suitable ranges.

In the embodiment of FIG. 1, an object is illustrated as a generator of infrared radiation. For example, the infrared radiation can be long wavelength infrared radiation that is focused by LWIR imaging optics 114 (e.g., an infrared lens) toward a beam splitter 116 (e.g., a dichroic beam splitter), that operates in a desired range of light, such as visible to IR.

The beam splitter can be utilized to refract the IR light onto a thermo-optical array 118. The thermo-optical array is an array of pixels having an absorbing film and thermo-optical array of sensors that transition from transparent to opaque with respect to light in response to temperature changes.

Thus, IR light hitting the thermo-optical array generates a thermo-optical effect manifested as transmission changes in a desired spectrum. In various embodiments, a dichroic beam splitter can be beneficial as LWIR light will be reflected and SWIR light will be transmitted to the imaging array.

By directing infrared light, such as LWIR (e.g., via the lens and/or beam-splitter) onto the imaging array, the transitions may be representative of images of the object generating the infrared light. Various embodiments can include imager optics 120 (e.g., one or more lens) to direct the light from the beam splitter toward the imager array. In some embodiments, the array may be directly viewed by a user via an eyepiece or view screen when the transmission changes are in the visible spectrum.

In some embodiments, a CMOS detector is positioned opposite the beam splitter from the array such that light from the array passes through the beam splitter to the imaging array. This detector can, then, analyze the received light and provide a viewable image on a display for a user to view. In this manner, even though the light may not be visible, the display can illustrate what the light is depicting to the user.

In some embodiments, a backlight may be positioned below the array. The backlight (e.g., with thermo optical array 118) can be utilized to emit light through the thermo-optical array.

This light can, for example, be collimated (e.g., via one or more lenses) to illuminate the thermo-optical array. In some such embodiments, the light passes through the thermo-optical array and through the beam splitter and is imaged onto the imaging array.

The backlight is the source of radiation to the CMOS imaging array that is modulated by the thermo-optical array temperature. In some embodiments, it may utilize very little power by being operated, for example, only when detection of LWIR heating is happening.

In various embodiments, the imaging array may include a CMOS CCD array to convert the light to an electronic output, which may be transmitted to a display device. The CMOS CCD array may operate in the visible range of light, or may be optimized to operate in a range corresponding to the spectrum at which transmission changes of imaging array are most prevalent, such as in the range of 1.1 μm to 1.5 μm, or other wavelength ranges. One example array at these wavelengths includes Germanium (Ge)-CMOS arrays pushed to 1.5 μm or a pushed CMOS CCD made by hitting the array with a laser beam during fabrication to increase quantum efficiency at desired wavelengths.

Figure 2:
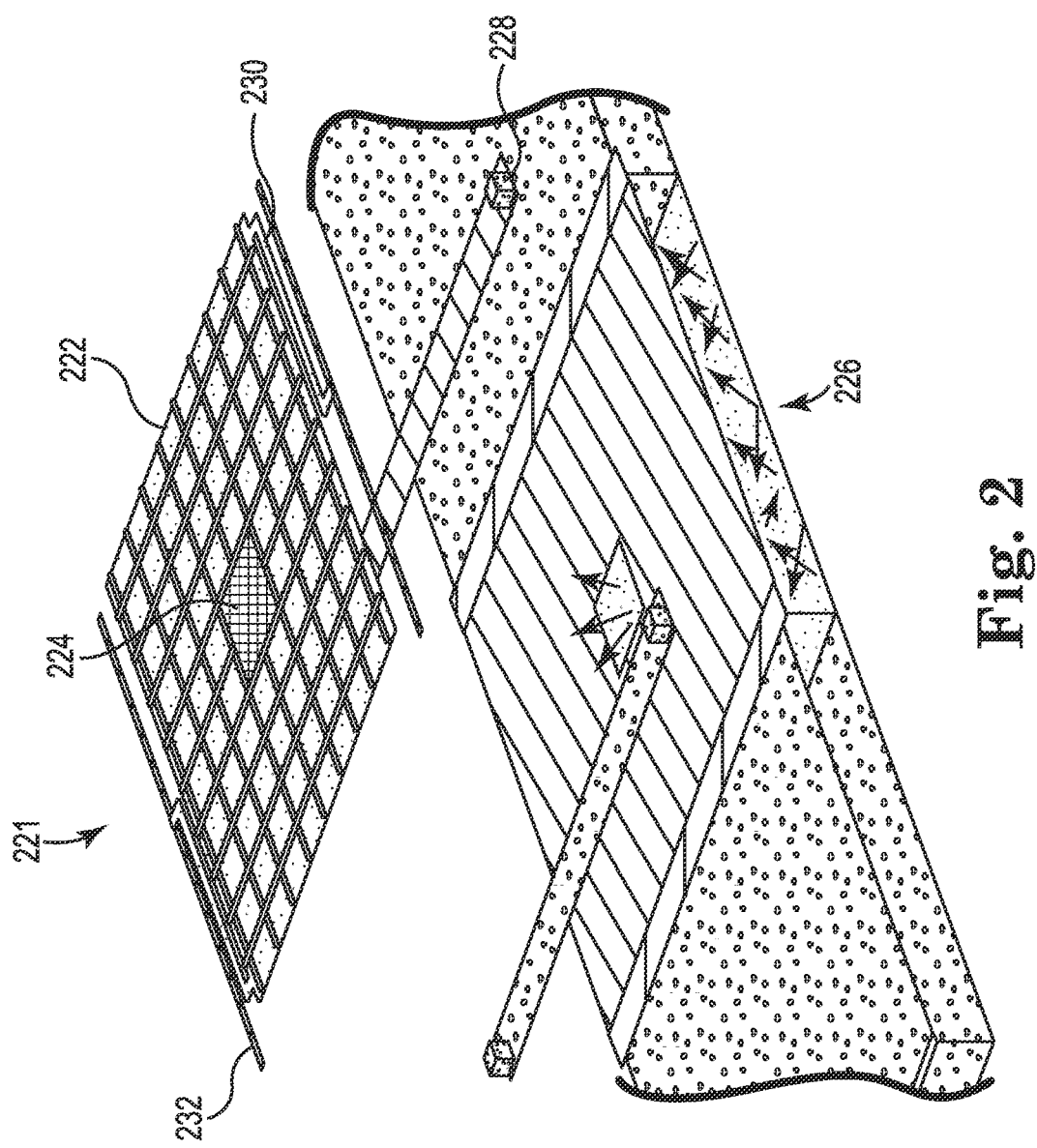
FIG. 2 illustrates a pixel assembly mounted over a substrate in accordance with one or more embodiments of the present disclosure.

FIG. 2 illustrates a pixel assembly of an embodiment of the present disclosure. In the embodiment of FIG. 2, the pixel assembly is provided by a pixel body 222 formed from a grid with one or more windows 224 formed therein. The pixel 221 is positioned over a substrate 226. In the embodiment of FIG. 2, this is accomplished via a number of posts 228. The pixel assembly includes a number of legs 230 attached to a number of heating elements (e.g., strip heaters) 232. The heating elements are attached, for example, to the tops of the posts.

Embodiments can utilize vanadium dioxide ($VO_2$) as a fabrication material for components of the pixel assembly, which can, for example, provide larger responsivity than $VO_x$ components of a device, in some instances. Some benefits of the embodiments disclosed herein include, that $VO_2$ materials can have transitions of much greater than 10%/K compared to devices, such as a bolometer, utilizing $VO_x$ of 2-3%/K. In utilizing $VO_2$, the pixels do not need a $VO_x$ electrical contact. Other benefits of a $VO_2$ design include better thermal isolation.

Embodiments also can provide reduced noise, such as 1/f noise which can limit and/or reduce noise equivalent temperature difference (NETD) performance. As discussed above, in embodiments herein, the pixel does not have to be integrated with CMOS and so fabrication can be simpler, in some implementations.

Embodiments discussed herein can provide a $VO_2$ transmission change with temperature that can be in the 1.5-3.0 μm range making operation in the short wavelength infrared (SWIR) band desirable. In some embodiments, a Ge-CMOS provided a good SWIR detection, for example, when cooled (e.g., −60 to −100 C). It was also found to have desirable 1.5 μm detectability when operated uncooled which could be utilized, for example, for low cost operation applications.

A light emitting diode (LED) backlight operating, for example, at 1.5 μm can provide sufficient backlight intensity for use, in some embodiments.

In various $VO_2$ embodiments, the $VO_2$ material has shown hysteresis and to avoid a "memory" effect, the temperature of the pixels can be adjusted to pulse heat them into a transition region on each frame for sensing. In such embodiments, the array is thus capable of operating in a range of temperature environments while maintaining the sharp opto-thermal $VO_2$ properties.

Pixels with very low thermal isolation and high temperature sensitivity were possible in some embodiments because of the lack of a need for probe resistor on the pixel. A probe resistor is used to measure resistance on the pixel, however, in the present disclosure, temperature is the quantity that is being analyzed.

With regard to embodiments utilizing a $VO_2$ film material some benefits include sharp optical transition at a wavelength compatible with an uncooled CMOS readout. This may allow for near room temperature operation.

Further, a thin film can be utilized which can provide a low thermal mass. Such embodiments may provide a film that can achieve optimal optical properties on a membrane with the support of thin buffer films.

One process that can be used for $VO_2$ film formation is ion beam sputtering. $VO_2$ ion beam sputtering is a process where, for example, 2 kV ions from a plasma ion gun are aimed at a target (e.g., V or $VO_2$ target) in the presence of additional oxygen flow in the system. The sputtered material is typically captured on a rotating substrate located above the target.

Such an ion beam sputtering process can also be utilized to develop $VO_x$ films, for example, on silicon wafers. In some embodiments, the films can be created on a variety of substrates in heated and/or unheated conditions during deposition. In various embodiments, the oxygen level can be controlled during deposition which can result in better quality film formation.

In some embodiments, the $VO_2$ films can be annealed, for example, at high temperatures for improved properties. For instance, annealing at 450° C. for 30 minutes in an oxygen environment may provide film having enhanced thermal, optical, and/or electrical properties.

In some embodiments, a multiple gun formation technique can be utilized. For example, in some embodiments, a second low voltage beam is aimed at the growing substrate to impart crystal orientation. Such embodiments can provide improved film properties, in some situations.

In some embodiments, buffer films may be desirable to achieve good $VO_2$ properties on membrane-like films. In such embodiments, the buffer films are desired to be thin, for low mass, on the pixel structure but also crystalline to support $VO_2$ crystallinity desired for good optical transitions. The use, for example, of a second ion gun aimed, for instance, at 45 degrees at the growing film may produce better buffer films with superior crystallinity, in some implementations.

Any suitable material can be utilized as a substrate for growing $VO_2$. For example, Aluminum Trioxide ($Al_2O_3$) and Titanium Dioxide ($TiO_2$) are two such suitable materials, in part, due to their crystalline structure.

The temperature of the pixel induced by the absorbed LWIR radiation is transmitted to the central $VO_2$ "window" on the pixel. Changes in the transmission of the $VO_2$ window can then be directly correlated with the temperature change of the pixel. The intensity of the backlight radiation transmitted though the pixel window, can for example, be imaged by SWIR glass optics onto a Ge-CMOS imaging array.

Because of potential $VO_2$ hysteresis, it may be necessary to operate below the transition and bias the thermo-optical array into the transition region for each frame. This has the benefits of allowing for a steep transition while maintaining the ability to operate at any environmental temperature by applying a heating pulse of sufficient magnitude.

In some embodiments, it may be beneficial to have a maximal temperature of the environment be below the $VO_2$ "reset" temperature. In such embodiments, this reset temperature is where the $VO_2$ returns to its low temperature state and all hysteresis effects are removed. In such embodiments, a heater pulse provides the temperature to drive the $VO_2$ into the steep part of the transition and the infrared radiation provides the differential heating above this value. As another method, the array can be thermally stabilized to some temperature below the transition with a heating pulse that is independent of the ambient temperature.

One factor in the design that can be beneficial in embodiments of the present disclosure is that the pixel can have low thermal mass while still having sufficient film thickness to achieve the desired optical effect. FIG. 2 provides an exploded schematic of a pixel that can provide such characteristics.

In some embodiments, the substrate can be coated with a thin film, conducting, reflector with a hole in the center through which the backlight can be transmitted. Current flowing in this thermo-optical array from contacts on the edge (e.g., one or more heat strips), can provide the power to heat the pixel into the transition region.

This heating can be achieved by driving the current through one or more strip heaters attached to the pixel. These strip heaters are thermally conductive and have a heating time constant that is shorter than the pixel time constant and hence do not significantly impact pixel response time and frame rate.

Attached to the center of strip heater leg is an $SiO_2$ thermal support leg which is an insulating component and thermally connects the pixel body to the strip heater temperature source. Unlike typical bolometers which utilize two low thermal conductance metal legs for electrical $VO_x$ readout, this pixel leg can be totally resistively isolated from the substrate, in some embodiments.

Because of the non-conductive nature of this pixel support leg, it does not have to be as long to maintain thermal isolation between the pixel and the substrate. Since the time constant of the pixel ($t=C/G$) is proportional to the thermal mass C and inversely proportional to the thermal conductance, the use of low conductance $SiO_2$ in the legs means that less of the pixel area will be occupied by the supports. This can be beneficial, for example, as the thermo-optical array pixel size goes from 50 μm to 10-17 μm where the camera becomes much smaller.

The strip heaters can be made of $VO_{2-x}$, Nichrome (NiCr), Hafnium Nitride (HfN), or other high resistance material. In various embodiments, the material would most likely be a slightly different formulation than the transition material and have a high resistance at the temperature where the $VO_2$ window is in the transition region undergoing transmission changes with temperature.

In some embodiments, $VO_{2-x}$ can have a higher resistance required for low current heating than NiCr or HfN. In various embodiments, the pixel $SiO_2$ support legs could be attached to the center point of the $VO_{2-x}$ strip heater.

In various embodiments, the heat flows from the strip heater to the pixel at the time constant of the pixel. After the $VO_2$ transmission is sampled, the pixel can be allowed to cool back to the ambient condition with the strip heater turned off. So this pixel readout process involves a time constant that is 2*tau.

In some embodiments, the pixel mass can be kept low, for example, by having a grid that has a sheet resistance of 360 ohms/square. Any suitable one or more materials can be used for formulating the grid having one or more of the following characteristics: mass, resistance, size, and/or stiffness.

For example, for a high-modulus metal like tungsten (W) with thin metal grid lines and 1% fill factor, this requires a film of 15 nm which should be sufficiently stiff to be self-supported. In some embodiments, a lower-modulus NiCr metal grid with similar sheet resistance and 280 nm thickness could be used but it would add to the pixel mass.

In various embodiments, the $VO_2$ window can be on the order of 100 nm to achieve the desired transmission changes, however, other suitable sizes can be utilized. In such embodiments, by keeping the window area small it does not sufficiently increase the thermal mass.

With regard to the $VO_2$ window material, this window can, for example, be deposited on a thin $SiO_2$ and/or $TiO_2$ film. For example, suitable $VO_2$ properties can be achieved on 10 nm thin $TiO_2$ films. In some embodiments, thin $SiO_2$ films can be used for support and not add significantly to the thermal mass, among other suitable support materials.

In various embodiments, the window region may account for about 90% of the total mass even though it accounts for only about 4% of the area. This is why an optimal pixel design can be achieved, for example, by looking at a division of the mass into the large-area small-mass LWIR grid region and the small-area large-mass SWIR $VO_2$ window, among other techniques.

As illustrated in FIG. 2, the window material (e.g., $VO_2$ film) 222 can be in thermal contact with the metal grid lines of the body 221 which absorb the LWIR radiation and transfer the heat to the window material. In some embodiments, the pixel assembly can be very efficient, for example, with a calculated broad band LWIR absorption in the grid region of pixel exceeding 95%.

Some features that can be used to evaluate pixel design can include thermal mass and conductance. For example, one suitable design includes a $VO_2$-windowed pixel that is attached to one or more thermally isolated strip heaters.

Current through the strip heaters, provides heat to the pixel leg which is in contact with the center point (may be in contact at an alternative and/or at other points) of the leg. Heat is conducted to the pixel from the strip heater.

The strip heater time constant is faster than the pixel thermal leg time constant and so the overall rise and fall time is determined by the $SiO_2$ pixel conductance leg. In some embodiments, a leg with radiative and conductance heat losses can achieve equilibrium in less than 4 msec.

At this point, the window region has come to equilibrium and the backlight is projected through the window on to the Ge-CMOS which records the intensity. In some embodiments, if the CMOS is serially addressed from top to bottom, then the thermo-optical array pixels can be brought into the window transition sequentially as the CMOS views subsequent rows.

In such embodiments, during the time while the pixels are being heated row by row, the backlight can remain on. In some embodiments, the heater resistor, which utilizes a high sheet resistance, can be made a different $VO_2$ formulation than the doped imaging array $VO_2$ material which has an electrical/optical transition while the heater $VO_2$ material maintains a high resistance.

In some embodiments, the pixel with low thermal conductance and thermal mass is subject to both conductive and radiative losses. Because of the radiative losses, the pixel has a faster time constant for the same final temperature although it requires more power to achieve that temperature.

For an example of a pixel with thermal mass of 2.4e-11 J/K and a thermal conductance of 5e-9 W/K the time constant shown below achieve 99% of the final value in 3.6 msecs considering worst case total radiative losses (compared to 16 msecs if no radiative losses occurred). The power utilized to achieve the final temperature can be increased from 0.11 μWatts/pixel (without full radiative loss) to 0.9 μWatts/pixel (when full radiative losses are added) but this increase is largely offset by the shorter time that the pixel must be heated to achieve steady state conditions.

Assuming, for example, that a pixel is heated for only 4 msecs per 32 msec frame time, the duty cycle would be 12.5% and so the power consumption for heating a pixel with radiative losses is slightly over 0.1 μWatts per pixel. In such an embodiment, the power to heat an entire 640×480 array would be approximately 30 mWatts.

With regard to temperature change, in some embodiments, a 10 mK temperature change in a 300K target viewed with f/1 optics can generate a temperature change in the pixel. Considering both conductive and radiative losses for such an embodiment, a pixel heated from 20° C. to 30° C. is 0.63 mK hotter in the presence of this additional LWIR radiation. This 0.63 mK temperature increase of the pixel generates a transmission loss in the window which in turn is sensed as a signal reduction in the imaging array (e.g., Ge-CMOS array).

Figure 3:
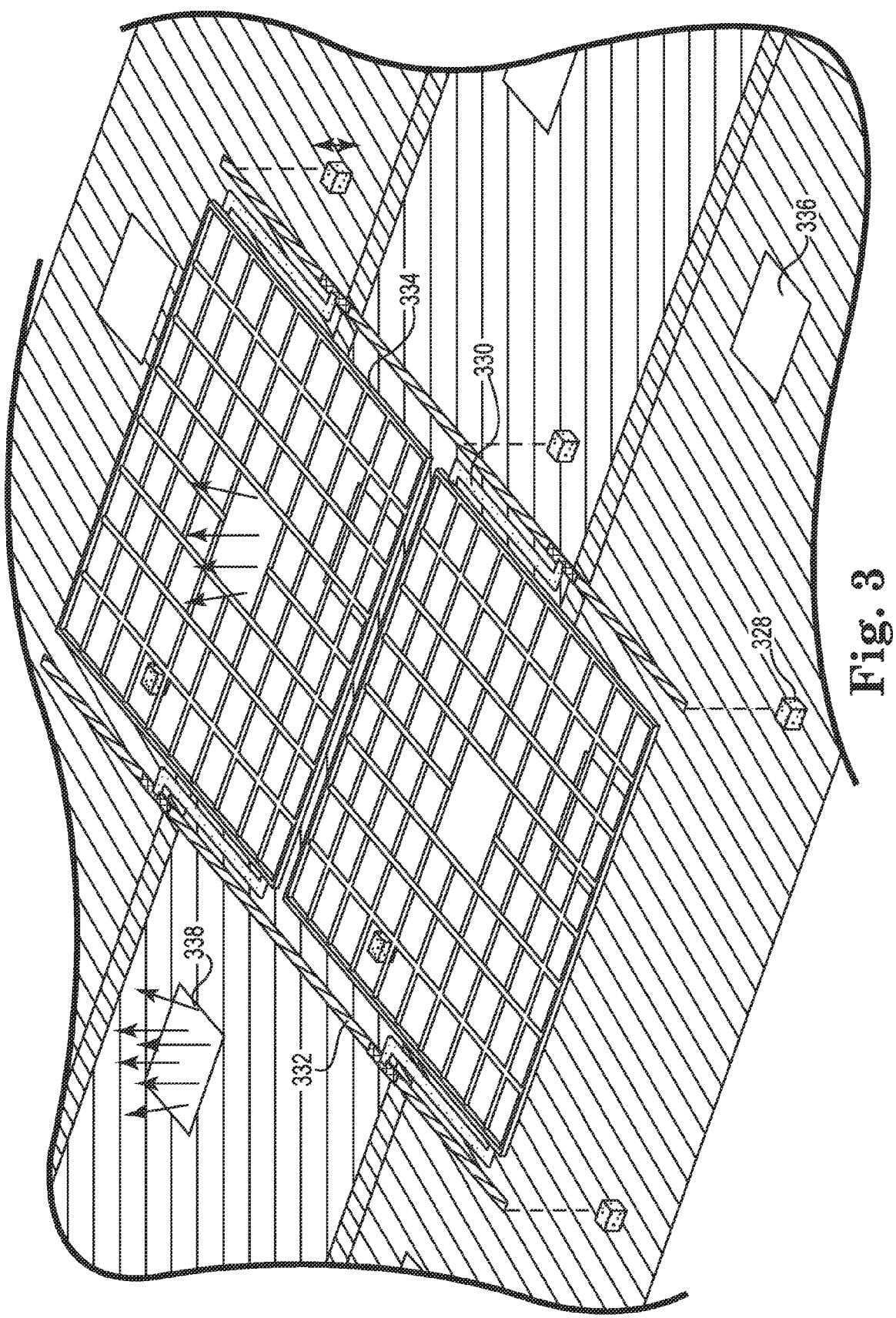
FIG. 3 illustrates another pixel assembly embodiment mounted over a substrate in accordance with one or more embodiments of the present disclosure.

FIG. 3 illustrates another pixel assembly embodiment mounted over a substrate in accordance with one or more embodiments of the present disclosure. In this embodiment, multiple grid portions 334 are shown adjacent to each other.

It should be understood from this example, that many of these grids can be arrayed together in side-by-side, relation in one or two dimensions. Additionally, it should be understood that an embodiment may include a single grid with multiple windows.

The embodiment of FIG. 3 also illustrates that multiple devices can share strip heaters (e.g., heater 332). Some embodiments may also share posts 328, as illustrated in FIG. 3 and legs 330. FIG. 3 also illustrates that the placement of backlight apertures and reflectors on powered and ground path conductive portions of a substrate (e.g., powered 336 and ground 338 apertures with backlighting and reflectors).

Figure 4:
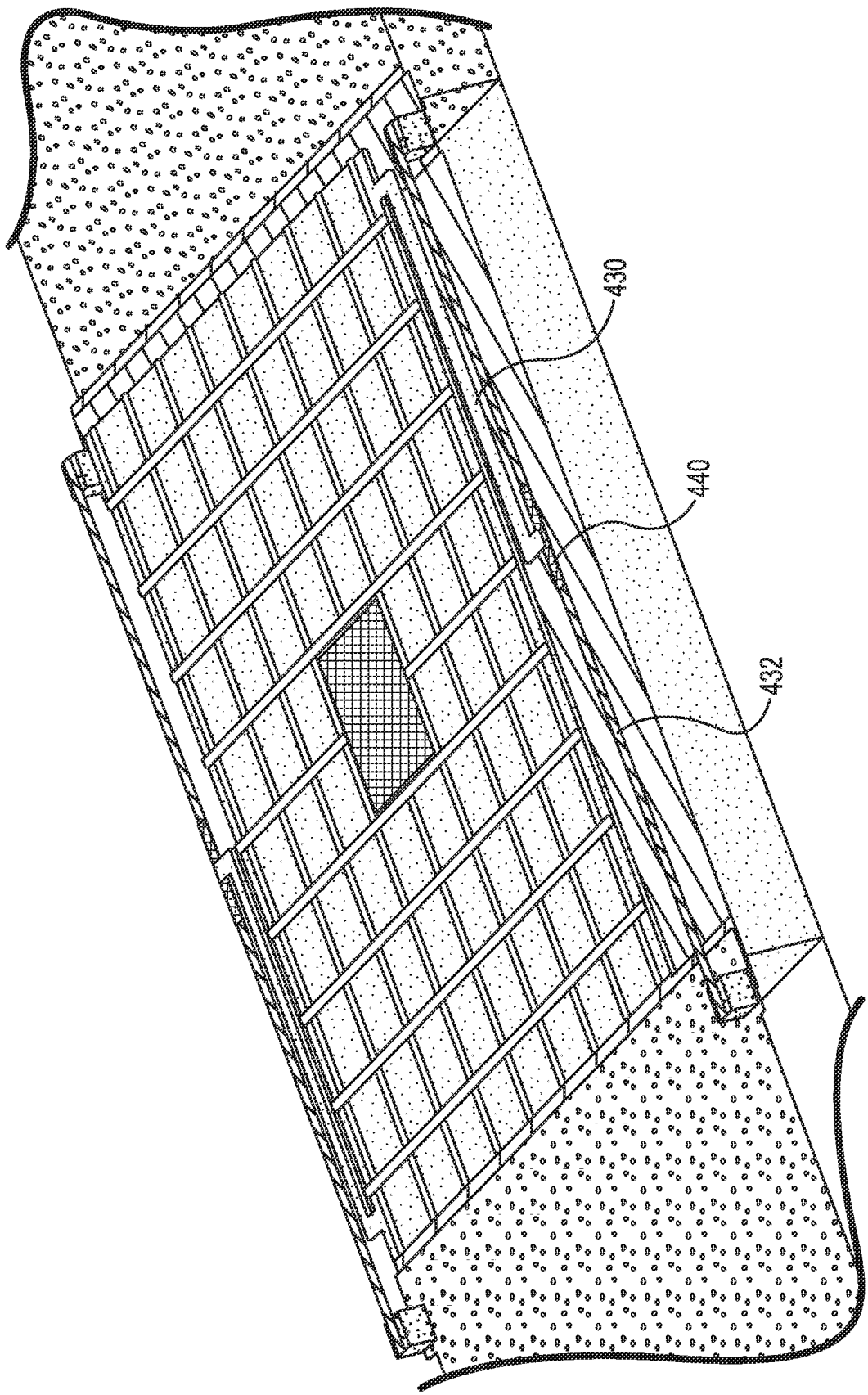
FIG. 4 illustrates another pixel assembly for use in accordance with one or more embodiments of the present disclosure.

FIG. 4 illustrates another pixel assembly for use in accordance with one or more embodiments of the present disclosure. Embodiments of the present disclosure can achieve LWIR imaging via a thermo-optical array where infrared light heats up the array which can be composed of multiple thermally isolated pixels.

In some embodiments, each pixel contains a $VO_2$ element as part of the pixel structure. When the pixel is heated, this $VO_2$ element changes temperature and transmission. In various embodiments, the array can be backlit with narrow band IR in the approximate 1-2 μm range where $VO_2$ has its greatest transmission change and is readout by an SWIR sensor in the imaging array that is capable of detecting changes in the intensity level of the light.

However, $VO_2$ can have a hysteresis behavior in some implementations. Because of the hysteresis, the pixel may have to be reset after each frame to a generally identical film condition.

To do this means restoring the pixel to a lower temperature such that the pixel can be reheated to the same spot in the $VO_2$ transition region and provide generally the same transmission change for generally identical LWIR radiation fluxes. This heating can be achieved, for example, by applying current to a thin film resistor which heats the pixel consistent with the power provided given the pixel time constant and thermal mass and conductance.

In some pixel configurations, heating with a fixed current could drive the pixel to a temperature that is incrementally higher than the ambient temperature but this might cause the pixel to not be in the transition region of the $VO_2$ material (e.g., film). In such embodiments, in order to get the pixel to the transition region, the pixel assembly can have a $VO_2$ resistor patch on the heating element.

In such embodiments, the $VO_2$ resistance can go from a high resistance level, where heating is achieved, to a low resistance level when it reaches the transition and at this point very little power has to be applied. This $VO_2$ control resistor can ensure that the pixel is positioned (e.g., centered) on the $VO_2$ transition region and IR radiation that strikes the pixel assembly, which is thermally isolated from the heating resistor, provides added temperature that can be indicative of the LWIR absorbed intensity. In some embodiments, such a mechanism can ensure that the pixel is environmentally insensitive and/or is operating at the same temperature base.

For maximum sensitivity, the pixel should be at the steepest part of the opto-thermal transition in $VO_2$ which may be beneficial in some embodiments. One method to achieve this is to precisely control the current to the pixel heater strip such that the temperature rise above the ambient substrate temperature is just sufficient for $VO_2$ to be in the transition region.

Another suitable method to control this heating temperature change is to deposit a VO$_2$* patch on the strip heater leg. This VO$_2$* patch formulation takes advantage of the VO$_2$ resistance change characteristics and uses this VO$_2$* resistance drop to limit the strip heater temperature to the desired VO$_2$ window in the middle of the transition edge. VO$_2$* may be the same material as in the window or may be modified by doping, for example.

FIG. 4 shows a schematic of a pixel that contains a VO$_2$* temperature sensitive resistance patch 440 on a strip heater leg 432. The figure shows a patch on each strip, but embodiments are not so limited.

In some embodiments, the VO$_2$* patch properties can achieve the desired performance that makes the operating pixel temperature independent of the drive current. FIG. 4 also shows that the VO$_2$* heater patch can be in contact with pixel leg (e.g., SiO2 leg material). Embodiments having one or more heater patches can benefit from the patches in controlling the pixel temperature reproducibility from frame to frame.

Figure 5:
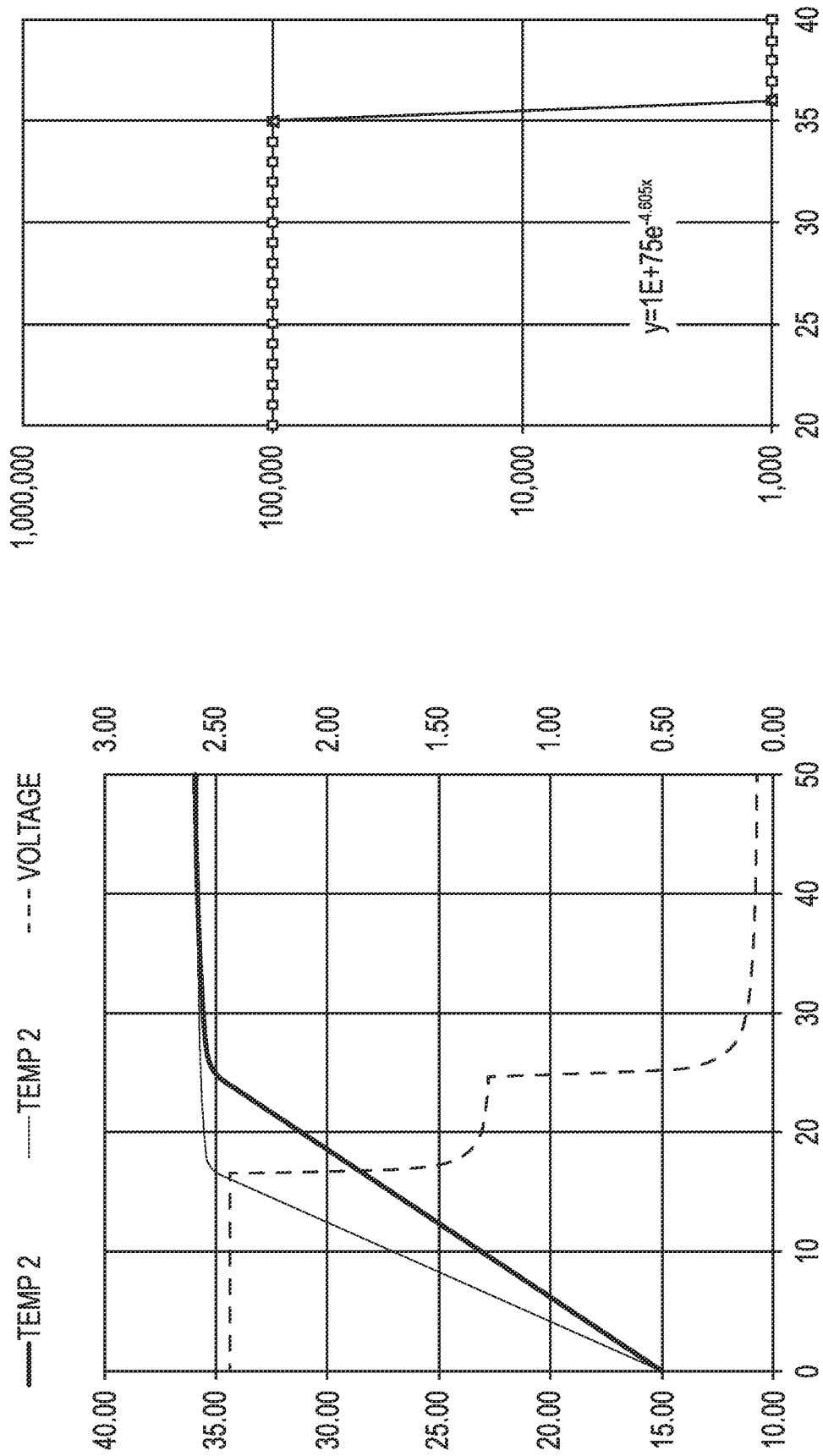
FIG. 5A illustrates an embodiment having the temperature rise, of two pixels with different thermal properties, but the same type of patch, with respect to time and illustrates that they both equilibrate to a similar temperature.
FIG. 5B illustrates an embodiment have a representation of $VO_2^*$ properties which can have a resistance change from 100K to 1K from 35 to 36 degrees.

FIG. 5A illustrates the temperature rise, of two pixels with different thermal properties, but the same type of patch, with respect to time and illustrates that they both equilibrate to a similar temperature. FIG. 5B illustrates a resistance of two pixels as a function of temperature.

FIG. 5B provides a representation of VO$_2$* properties which can have a resistance change from 100K to 1K from 35 to 36 degrees (FIG. 5B). When the pixel is heated by a generally steady current (FIG. 5B), the temperature rises as long as the resistance is high but at 35 degrees the resistance drops and I$^2$*R heating drops by 100× because of a resistance change and the pixel temperatures (Temp 1 and Temp 2 on FIG. 5A) stabilize to ~35 degrees. The two pixels represented in the Figures have different time constants and so reach equilibrium at slightly different times, but stabilize to the same temperature which they would not have done with a temperature limiting VO$_2$* resistor unless the current to each pixel was controlled uniquely, in this implementation.

Figure 6:
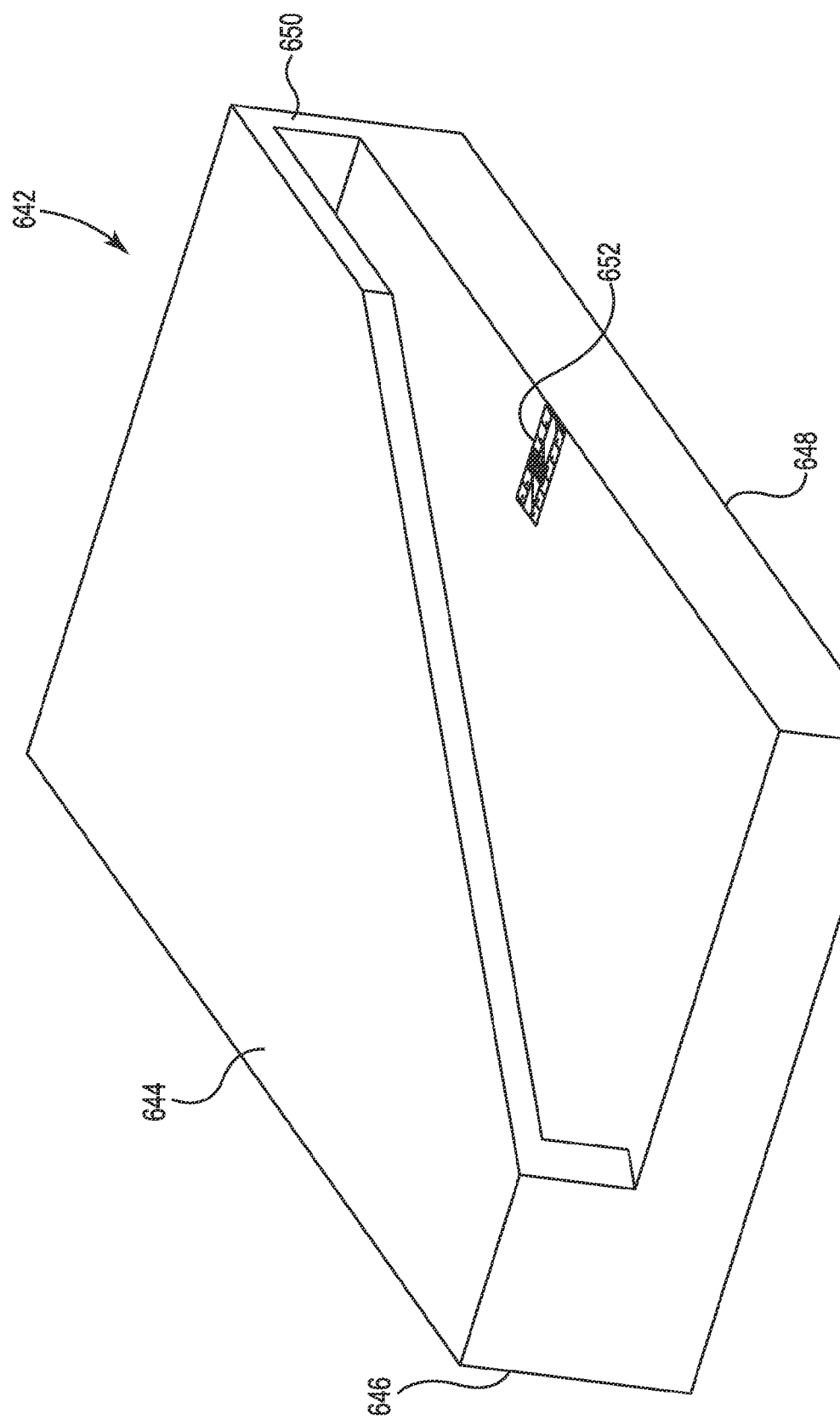
FIG. 6 illustrates a vacuum package assembly for use in accordance with one or more embodiments of the present disclosure.

FIG. 6 illustrates a vacuum package assembly for use in accordance with one or more embodiments of the present disclosure. As illustrated in FIG. 6, in various embodiments, the thermo-optical array is provided in a vacuum package 642 to preserve the pixel thermal isolation. In some embodiments, since the thermo-optical array operates in the SWIR and LWIR bands, the array can be configured, for example, with a Si backplane and/or a Si window.

Suitable materials for package formation can include those materials providing SWIR and LWIR antireflection (AR) on the front window. Such materials can include coatings that can be applied to another material. Depending on the backlight mechanism, the back of the Si wafer may benefit from a SWIR AR coating and/or a reflective coating.

The embodiment illustrated in FIG. 6 is a cut-away representation where a window portion of a vacuum package has been cut-away. The embodiment of FIG. 6 illustrates a vacuum package 642 that includes a window portion 644, a backlight portion 646, a reflector portion 648, with a wafer to wafer seal 650 between the window portion 644 and the backlight portion 646. A pixel assembly 652, similar to that shown in FIG. 3 is provided in FIG. 6 to show how an embodiment having a vacuum package could be arranged with respect to a pixel assembly. As discussed above, multiple pixel assemblies could be arrayed side-by-side in one or two dimensions within a vacuum package.

The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of devices" can refer to one or more devices.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A thermo-optical array device, comprising:
   a pixel body, having a window formed therein, the pixel body arranged to receive long wavelength infrared light;
   a heating element in heat communication with the pixel body; and
   a substrate having a backlight that transmits light in the short wavelength infrared light range;
   wherein the pixel body is mounted above the substrate.

2. The thermo-optical array device of claim 1, wherein the pixel body is mounted above the substrate by mounting the pixel body on posts allowing the pixel body to be positioned above a surface of the substrate.

3. The thermo-optical array device of claim 1, wherein the backlight is provided in an aperture formed in the substrate.

4. The thermo-optical array device of claim 1, wherein the backlight is aligned with the window formed in the pixel body to allow for light from the backlight to pass through the window.

5. The thermo-optical array device of claim 1, wherein the pixel body is formed having a portion provided as a grid shaped form factor.

6. The thermo-optical array device of claim 1, wherein the pixel body and the heating element are connected via a non-conductive leg.

7. The thermo-optical array device of claim 1, wherein the heating element is a strip heater positioned along an edge of the pixel body.

8. The thermo-optical array device of claim 1, wherein at least a portion of the pixel body is formed from a vanadium dioxide material.

9. An infrared imager system, comprising:
a number of lenses,
an imager array,
a beam splitter that transmits light in the short wavelength infrared light range,
a thermo-optical array of sensors that transition between transparent and opaque with respect to a desired wavelength range of light in response to a change in temperature and wherein the thermo-optical array comprises: a pixel body, having a window formed therein, the pixel body arranged to receive long wavelength infrared light; a heating element in heat communication with the pixel body; and a substrate having a backlight that transmits light in the short wavelength infrared light range, and
wherein the beam splitter directs light to the imaging array and to the thermo-optical array.

10. The system of claim 9, wherein the lenses include a number of lenses that direct light to the beam splitter.

11. The system of claim 9, wherein the lenses include a number of lenses that direct light to the imager array.

12. The system of claim 9, wherein the system includes a backlight.

13. The system of claim 12, wherein the backlight includes a reflector.

14. The system of claim 9, wherein the thermo-optical array includes a backlight.

15. A thermo-optical array device, comprising:
a plurality of pixel bodies, each having a window formed therein, each pixel body arranged to receive long wavelength infrared light;
one or more heating elements wherein at least one heating element is in heat communication with each pixel body;
a substrate having a plurality of backlight apertures, wherein the substrate has at least as many backlight apertures as the number of windows on the pixel bodies and wherein each backlight transmits light in the short wavelength infrared light range; and
wherein each pixel body is mounted above the substrate.

16. The device of claim 15, wherein the device includes a number of posts that position the pixel body a distance from a surface of the substrate.

17. The device of claim 15, wherein electrical current is provided to the one or more heating elements from a portion of the substrate.

18. The device of claim 15, wherein the substrate includes a backlight aperture having an opening at a first end and a reflector at a second other end.

19. The device of claim 15, wherein at least one of the one or more heating elements includes a vanadium dioxide heat patch.

20. The device of claim 15, wherein at least one of the one or more heating elements includes a vanadium dioxide heat patch and wherein a leg is connected between the pixel body and the heat patch.

* * * * *